UNITED STATES PATENT OFFICE.

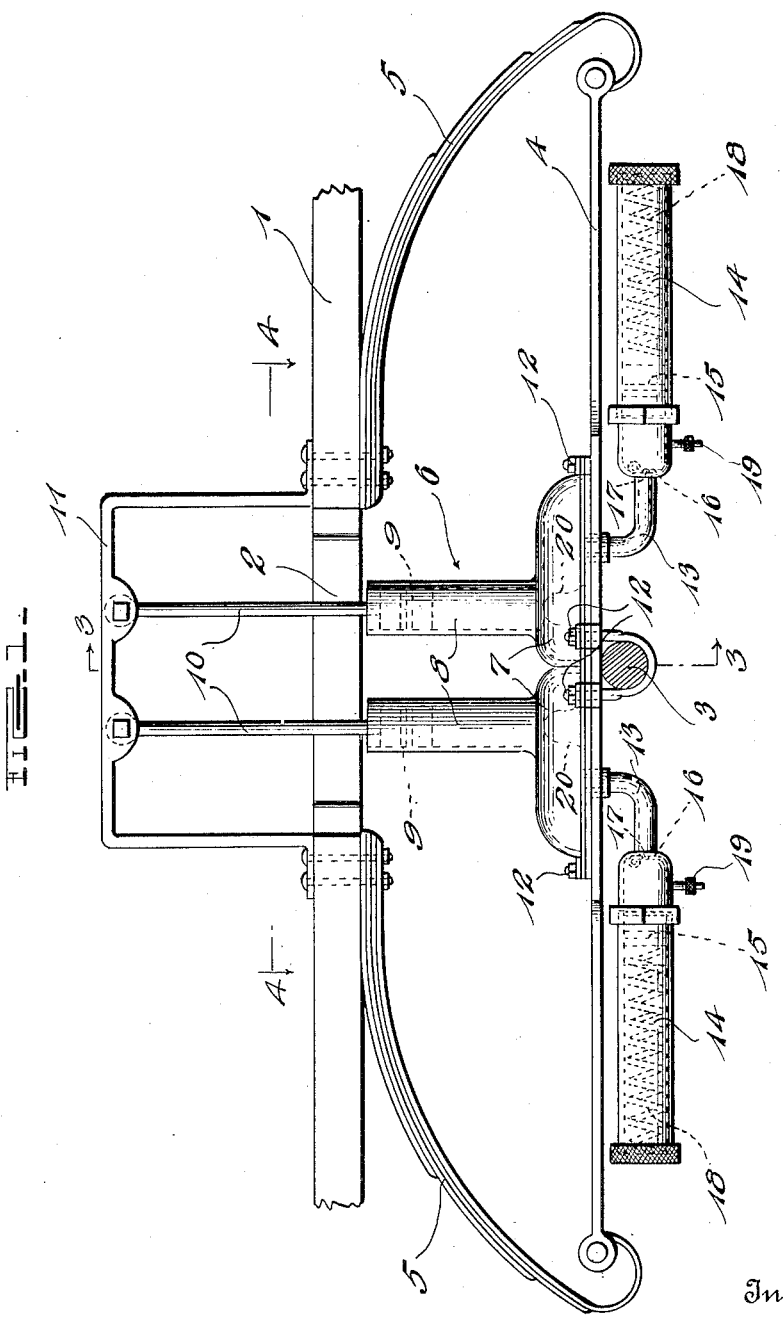

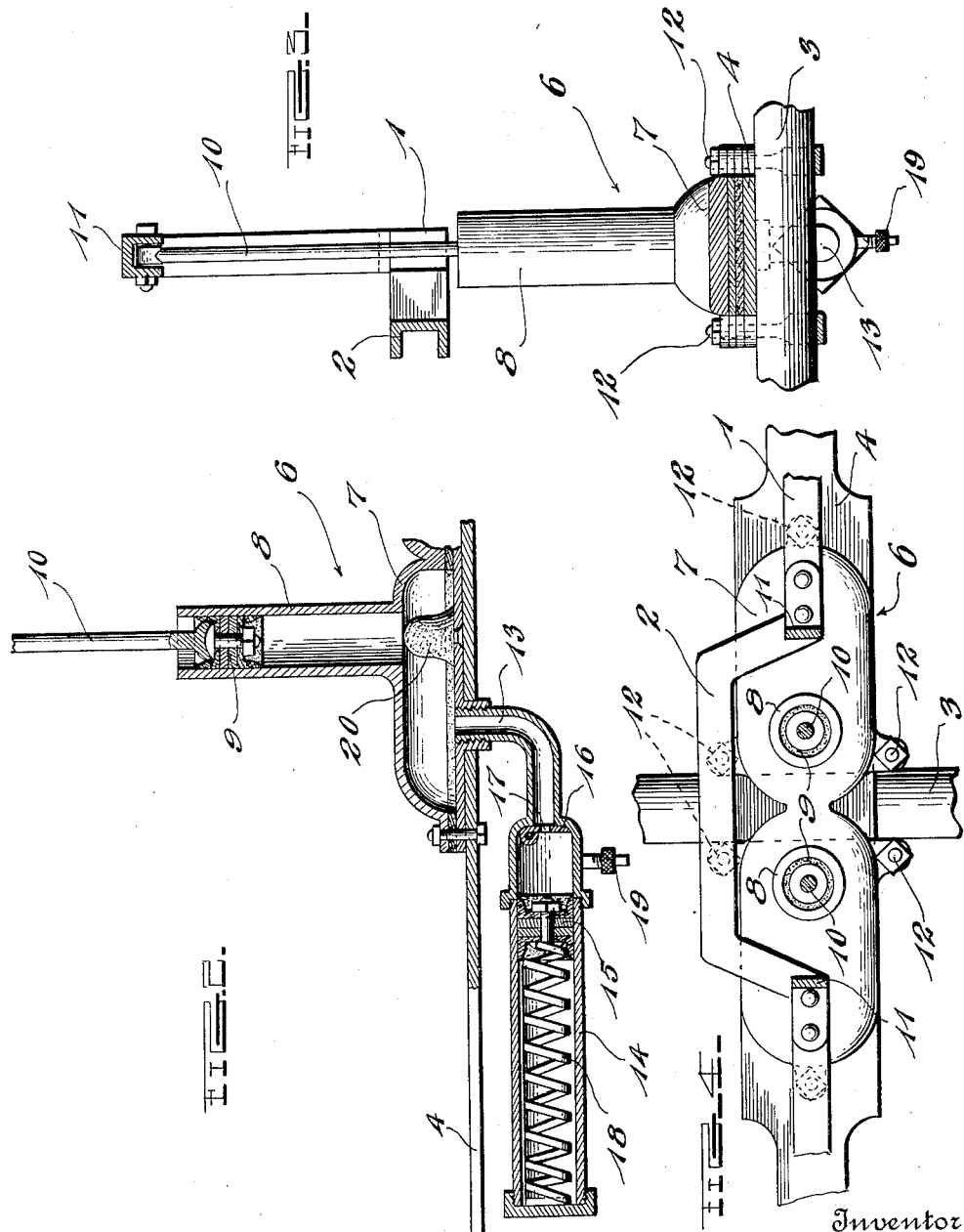

WILLIAM D. PAXTON, OF LAPORTE, INDIANA.

VEHICLE SHOCK-ABSORBING DEVICE.

1,367,668.  Specification of Letters Patent.  Patented Feb. 8, 1921.

Application filed March 11, 1920. Serial No. 364,922.

*To all whom it may concern:*

Be it known that I, WILLIAM D. PAXTON, a citizen of the United States, residing at Laporte, in the county of Laporte and State of Indiana, have invented certain new and useful Improvements in Vehicle Shock-Absorbing Devices; and I do declare the following to be a full, clear, and exact description of the invention, such as will enable others skilled in the art to which it appertains to make and use the same.

This invention relates to improvements in vehicle shock absorbing devices and it has more patricular reference to air cushioning means which is to be used in conjunction with the usual springs, serving to more effectively absorb the shocks and jars to which a vehicle is subjected due to rough roads.

The object of the invention is to provide a device of the above mentioned character which is simple and effective, strong, and durable; one in which the parts are readily and easily disconnectible, the device as a whole being comparatively inexpensive to manufacture.

Other objects and advantages of the invention will be apparent during the course of the following description.

In the accompanying drawings forming a part of this specification, and in which like numerals are employed to designate like parts throughout the same:

Figure 1 is a side elevation of a device constructed in accordance with my invention, the same being shown in use.

Fig. 2 is an enlarged detail sectional view of a portion of the device showing the construction more clearly.

Fig. 3 is a vertical sectional view taken on the plane of the line 3—3 of Fig. 1.

Fig. 4 is a view taken on the plane of the line 4—4 of Fig. 1.

In carrying out my invention I dispose fluid compressing means between the chassis bar and axle, it being brought into operation when the bar and axle are caused to move toward one another when the vehicle encounters an obstruction in its path of travel. Said means includes a casing which acts as a reservoir, and from which a quantity of air is expelled during the movement of the axle and bar toward each other. The expelled air is forced into a chamber which has communication with the casing. Between the latter and the chamber is a valve which is such that it will open when the air from the casing is forced against it and it will close when the axle and chassis bar begin to move away from each other, that is, on the rebound of the vehicle. Closing of this valve which has a hole in it, will retard the return of the air to the casing.

The foregoing operation is brought about by the employment of structure to be described in detail in the following description. To this end the numeral 1 designates a chassis bar which is provided with a lateral offset portion 2, the purpose of which will be hereinafter set forth. Movable toward and from, and disposed beneath the bar 1 is the axle 3 which carries a hanger plate 4, the primary function of which is to provide anchoring means for the leaf springs 5, which are secured at their opposite ends to the chassis bar, thus providing a novel way of supporting the vehicle body. However, this construction is not essential to my invention as my device may be effectively used with some of the springs now in use.

My invention resides in the construction of the fluid compressing means, designated as a whole by the numeral 6. This means includes a casing 7 formed from a casting, the casing being divided into two compartments. Tubular members 8 constituting cylinders, communicate with each compartment. In each cylinder is a piston 9 operated by means of a rod 10 having pivotal connection with a supporting frame 11, the latter being carried by the bar 1 and being secured thereto adjacent the offset part 2 so as to permit free vertical movement of the rods 10. It is to be noted that the rods 10 are not connected with the piston 9, but merely bear on them to operate them.' With this construction the rods will be permitted to angle, that is, they will move on their pivots due to certain movements of the body with respect to the wheels. The casing is secured to the hanger plate 4 by suitable fastening means such as bolts 12. Leading from the casing 7 are conduits 13 which communicate at their opposite ends with chambers or additional receiving cylinders 14. Cylinders 14 are likewise provided with pistons 15 which are operated by the pressure of air exerted against them when the pistons 9 are caused to move downwardly. Disposed at a point between the casing and the cylinders 14 either in the latter or in the conduits 13 are valves 16. As shown these valves are carried by the conduits and are so arranged that they are opened by excessive pressure which is brought about when a rough place in the road is encountered. However, they will automatically close upon the upward movement of the pistons 9 which action occurs on the rebound of the vehicle. As each valve is equipped with a hole 17, it will be seen that the return of the air from the cylinders 14 to the casing and cylinders 7 and 8 will be retarded. Pistons 15 are moved to a position to force the air from the cylinders 14 by means of coiled springs 18. To keep the cylinders 8 and casing 7 well supplied with air, I provide ordinary tire valves 19 to which a tire pump may be connected. Other than the already mentioned parts, there is no need of carrying the detail description any further except to mention that the numerals 20 designate rubber stops or buffers arranged in the casing and against which the pistons 9 may strike, thus limiting the inward movement of the latter and protecting them from injury. It might also be well to state that when in use, suitable packings will be employed at all joints and connections of the various parts of the device for the purpose of preventing leakage.

The operation of the device is as follows:

First, an ordinary tire pump will be connected to the valve 19 for the purpose of filling the parts 7, 8 and 13 with air after which the device will be ready for use. When an obstruction or uneven place in the road is encountered, the axle 3 and chassis bar 1 will be moved toward one another in the usual way, the shock being taken up partially by the springs 5 while at the same time the pistons 9 will be forced downwardly into the cylinders 8. Such action of the pistons will compress the air in the casing 7 and at same time force it against the valves 16. When the pressure becomes sufficient to overcome the tension of the springs 18, the pistons 15 will be actuated, which action of the parts will absorb the shock to which the vehicle has been subjected. Now, as soon as the parts 1 and 3 are moved away from one another by the springs 5, the pistons 9 and 14 will return to their original positions. So it will be seen that the shock will be a great deal less noticeable than with the spring alone. In case the pistons 9 are moved down too violently they will be prevented from becoming displaced from the cylinders 8 by the buffers 20 which are provided as has already been set forth.

A device constructed in accordance with my invention will be found exceedingly desirable and useful. It is entirely effective in use and will suspend the vehicle body on an air cushion at all times which feature is extremely advantageous when solid tires are used. In fact, I have found that solid tires may be effectively employed with my device, which is practically the equivalent of pneumatic tires. Then again, the device is so constructed that the parts may be easily disconnected for repairing whenever necessary. It also possesses other features which have become apparent, no doubt, from the foregoing description.

If the foregoing description is carefully considered in connection with the drawings, it is believed that a clear understanding of the operation and construction of the device will be had, therefore, further description is deemed unnecessary.

It is to be understood that the form of my invention herein shown and described is to be taken as a preferred form of the same, and that various minor changes in the shape, size, and arrangement of parts may be resorted to without departing from the spirit of the invention or the scope of the subjoined claims.

I claim:

1. A shock absorbing device for vehicles, the combination with a chassis bar and an axle movable toward and from the bar; of a vertical cylinder situated between the bar and axle, being supported by the latter, a plunger head movable in the cylinder, a second horizontally disposed cylinder, a plunger head movable in the last named cylinder, means in the latter to resist movement of the plunger head therein, a valved passage between the cylinders, and pivotally mounted means for actuating said plunger heads.

2. In a vehicle spring, the combination with a chassis bar and an axle movable toward and from the same; of a casing disposed between the bar and axle, being supported by the latter, including a vertical tubular portion constituting a cylinder, a plunger head reciprocable in said cylinder, an actuating rod co-acting at one end with the head, a support carried by the chassis bar, the other end of the rod having pivotal connection therewith, an air conduit communicating with the casing, a second cylinder with which said conduit also communicates, a plunger head reciprocable in the last mentioned cylinder, means in this cylinder to resist movement of the plunger head, and a pressure controlled valve in the conduit.

3. In a vehicle shock absorbing device, the combination with a chassis bar, an axle beneath the same and movable toward and from it; of a spring supported casing including a pair of tubular members forming cylinders, a piston in each cylinder, pivotally mounted rods for actuating the pistons, a conduit leading from each casing, additional cylinders communicating with each conduit, a piston in each additional cylinder, a coiled spring in each additional cylinder, a fluid operated valve in each conduit, and a tire valve to which a pump may be attached for supplying fluid into the casing and cylinders, whereby when the axle and chassis bar are moved toward one another, the fluid will be expelled from the casing into said last named cylinders, from which, through the action of the valves, it will be retarded in its return to the casing.

In testimony whereof I have hereunto set my hand.

WILLIAM D. PAXTON.